United States Patent
Knebel et al.

(10) Patent No.: US 7,343,479 B2
(45) Date of Patent: *Mar. 11, 2008

(54) METHOD AND APPARATUS FOR IMPLEMENTING TWO ARCHITECTURES IN A CHIP

(75) Inventors: Patrick Knebel, Ft Collins, CO (US); Kevin David Safford, Fort Collins, CO (US); Donald Charles Soltis, Jr., Fort Collins, CO (US); Joel D Lamb, Ft Collins, CO (US); Stephen R. Undy, Ft Collins, CO (US); Russell C Brockmann, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 593 days.

This patent is subject to a terminal disclaimer.

(21) Appl. No.: 10/602,916

(22) Filed: Jun. 25, 2003

(65) Prior Publication Data

US 2004/0030865 A1    Feb. 12, 2004

Related U.S. Application Data

(63) Continuation of application No. 09/496,845, filed on Feb. 2, 2000, now Pat. No. 6,618,801.

(51) Int. Cl.
*G06F 9/455* (2006.01)
(52) U.S. Cl. .................. 712/227; 712/215; 712/200
(58) Field of Classification Search .......... 712/200, 712/208–215, 227, 245–248
See application file for complete search history.

(56) References Cited

U.S. PATENT DOCUMENTS 5,459,844 A * 10/1995 Eickemeyer et al. ........ 712/213
5,613,117 A * 3/1997 Davidson et al. ........... 717/144
5,859,999 A    1/1999 Morris et al.
5,860,017 A    1/1999 Sharangpani et al.
5,875,316 A * 2/1999 Panwar et al. .............. 712/215
5,922,065 A * 7/1999 Hull et al. .................... 712/24

(Continued)

FOREIGN PATENT DOCUMENTS

EP    0709767 A1    5/1996

(Continued)

OTHER PUBLICATIONS

Wolfe, A., "Patents shed light on Merced's Innards", Electronic Engineering Times, Feb. 15, 1999, p. 43 and a page continued from p. 43.

(Continued)

*Primary Examiner*—Tonia L. Meonske

(57) ABSTRACT

The present invention is a method for implementing two architectures on a single chip. The method uses a fetch engine to retrieve instructions. If the instructions are macroinstructions, then it decodes the macroinstructions into microinstructions, and then bundles those microinstructions using a bundler, within an emulation engine. The bundles are issued in parallel and dispatched to the execution engine and contain pre-decode bits so that the execution engine treats them as microinstructions. Before being transferred to the execution engine, the instructions may be held in a buffer. The method also selects between bundled microinstructions from the emulation engine and native microinstructions coming directly from the fetch engine, by using a multiplexer or other means. Both native microinstructions and bundled microinstructions may be held in the buffer. The method also sends additional information to the execution engine.

13 Claims, 2 Drawing Sheets

U.S. PATENT DOCUMENTS 6,105,125 A * 8/2000 Nemirovsky et al. ....... 712/209
6,618,801 B1 * 9/2003 Knebel et al. .............. 712/215

FOREIGN PATENT DOCUMENTS

WO    WO96/24895    8/1996
WO    WO97/25669    7/1997

OTHER PUBLICATIONS

Preliminary Search Report issued Feb. 28, 2007 in counterpart foreign application in France under application No. FR 0012031.

* cited by examiner

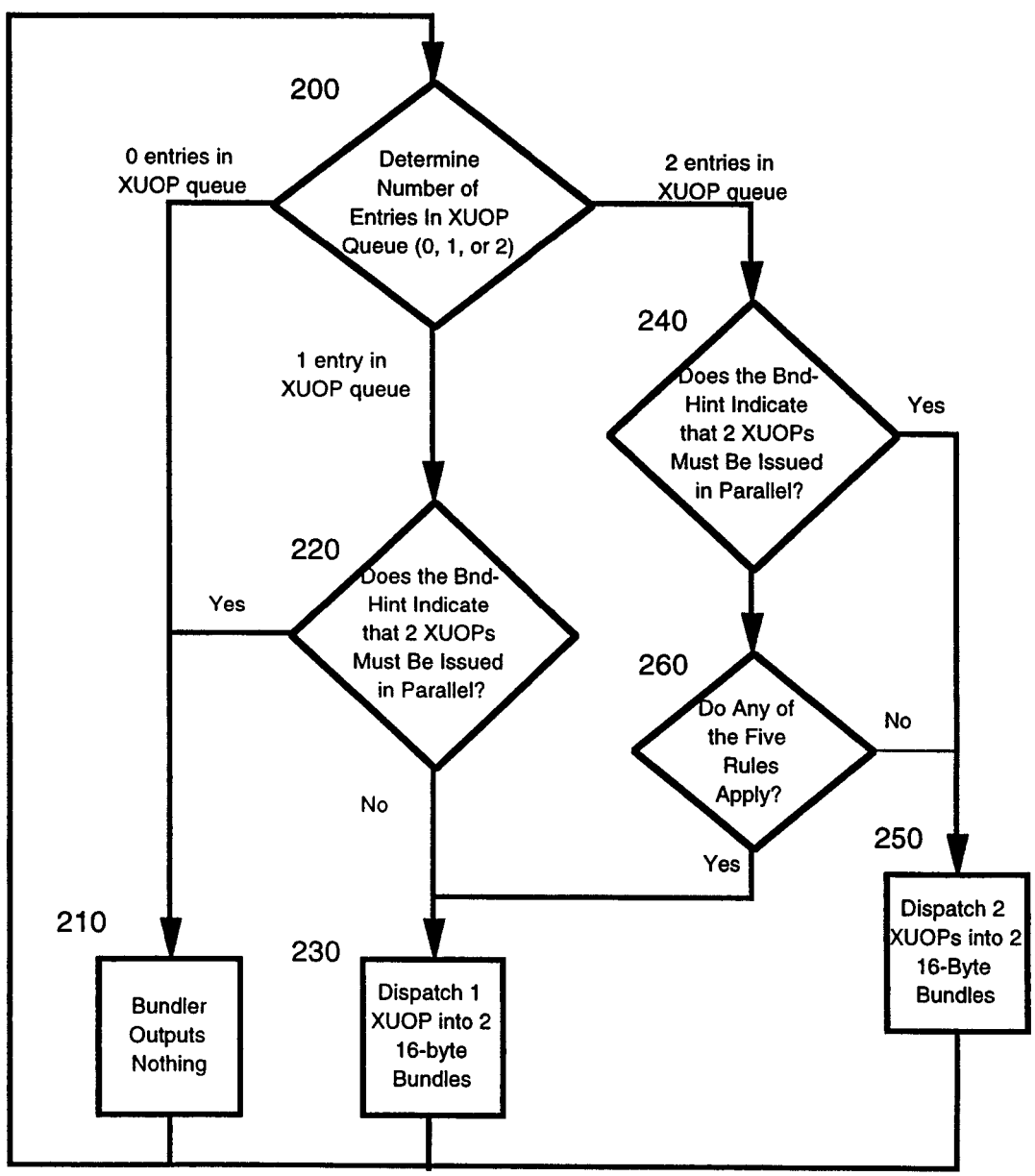

METHOD AND APPARATUS FOR IMPLEMENTING TWO ARCHITECTURES IN A CHIP

CROSS-REFERENCE TO RELATED APPLICATION(S)

This application is a continuation application of allowed U.S. application Ser. No. 09/496,845, filed Feb. 2, 2000 now U.S. Pat. No. 6,618,801, of common title and inventorship. Priority is claimed from this prior application.

BACKGROUND

Microprocessors exist that implement a reduced instruction set computing (RISC) instruction set architecture (ISA) and an independent complex instruction set computing (CISC) ISA by emulating the CISC instruction with instructions native to the RISC instruction set. Instructions from the CISC ISA are called "macroinstructions." Instructions from the RISC ISA are called "microinstructions." Existing microprocessors do not implement these two architectures as efficiently as can be done. Some existing processors use more global wires routing data to many parts of the chip. This makes chip routing more difficult and less efficient. These techniques also complicate the timing and the pipeline of the processor. It is desirable to create an efficient means of implementing both architectures on a single chip, while leveraging existing hardware. In particular, it is desirable to localize processing and dispatching of the instructions, with minimal impact on the existing execution engine.

SUMMARY

The present invention is a method for implementing two architectures on a single chip. The method uses a fetch engine to retrieve instructions. If the instructions are macroinstructions, then it decodes the macroinstructions into microinstructions, and then bundles those microinstructions using a bundler, within an emulation engine. The bundles are issued in parallel and dispatched to the execution engine and contain pre-decode bits so that the execution engine treats them as microinstructions. Before being transferred to the execution engine, the instructions may be held in a buffer. The method also selects between bundled microinstructions from the emulation engine and native microinstructions coming directly from the fetch engine, by using a multiplexer or other means. Both native microinstructions and bundled microinstructions may be held in the buffer. The method also sends additional information to the execution engine.

The present invention is also a computer system having a processor capable of implementing two architectures. The computer system has a fetch engine to retrieve instructions, an execution engine to execute the instructions, and an emulation engine to decode macroinstructions into microinstructions before their execution. The emulation engine uses a bundler to bundle microinstructions and other information into groups. These bundles are delivered to the execution engine in parallel.

DESCRIPTION OF THE DRAWINGS

FIG. 4 is a block diagram showing the bundle format.

FIG. 5 is a flow chart showing the operation of the bundler.

DETAILED DESCRIPTION

A. RISC Microprocessor

Figure 1:
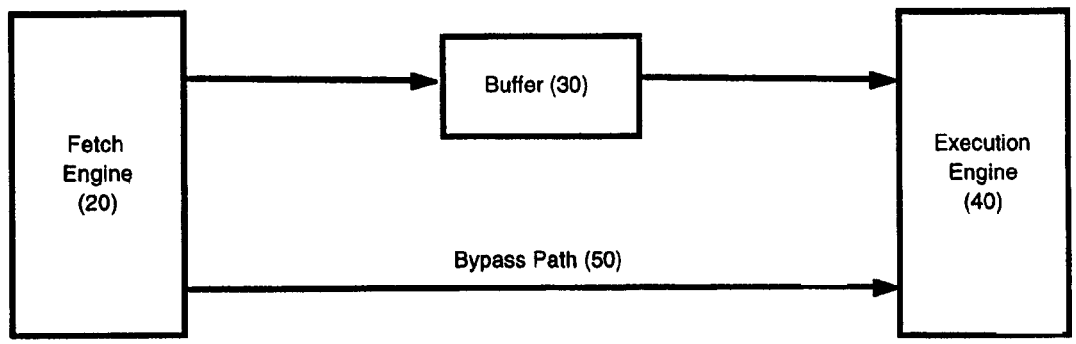
FIG. 1 is a block diagram of a RISC microprocessor.

In a very simplistic sense, a RISC microprocessor can be divided into two portions: an instruction-fetch engine and an execution engine. FIG. 1 shows a block diagram of a RISC microprocessor 10, having a fetch engine 20 and an execution engine 40. In some implementations such as the implementation shown in FIG. 1, the fetch engine is separated from the execution engine by a buffer 30. This buffer 30, also referred to as a queue, can be used to decouple the fetch engine 20 from the execution engine 40. While the fetch engine 20 writes new, incoming instruction into the buffer 30, the execution engine 40 reads and retires instructions from the buffer 30 in the same order as they were written. As long as there is room in the buffer 30, fetch engine 20 can get ahead of the execution engine 40. Once the buffer 30 fills, the fetch engine 20 must stall and wait for the execution engine 40 to take an instruction and free up a slot in the buffer 30. If the buffer 30 is empty, though, it is possible to create a bypass path 50 around the buffer 30 so that newly fetched instructions may pass from the fetch engine 20 directly to the execution engine 40 without first being written into the buffer 30.

Figure 2:
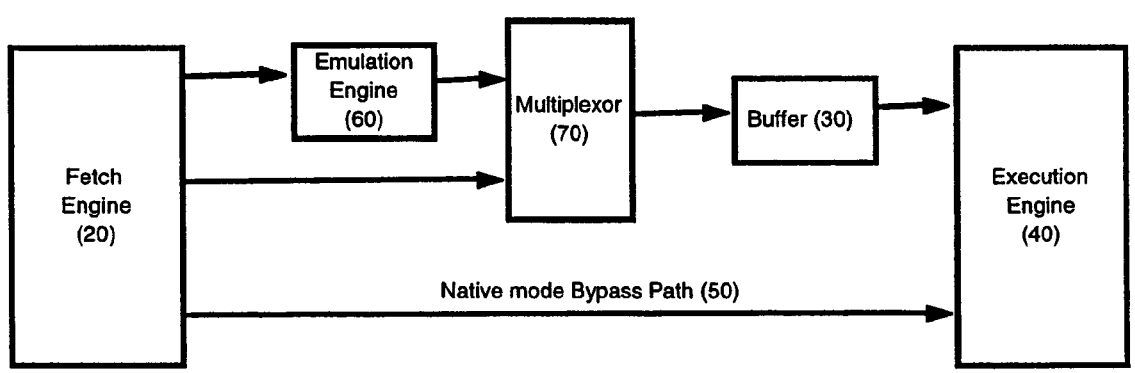
FIG. 2 is a block diagram of a RISC microprocessor showing further details of processing RISC and CISC instructions.

The present invention emulates a CISC ISA on a RISC machine. FIG. 2 shows a block diagram of a RISC microprocessor 10 after implementation of the present invention. To implement the present invention, an emulation engine 60 is required to convert a stream of instruction bytes into a sequence of microinstructions that can be understood by the RISC execution engine 40. As shown in FIG. 2, the emulation engine 60 receives an instruction stream from the fetch engine 20 and delivers the microinstructions to the execution engine 40. In a preferred embodiment, the present invention uses a multiplexer 70 to select instructions from either the fetch engine 20 or from the emulation engine 60. The multiplexer 70 then places the selected instructions into the instruction buffer 30. The emulation engine 60 does not have a bypass path 50 around the instruction buffer 30 because adding a bypass path 50 would cause the machine to operate at a lower frequency even when executing in native (RISC) mode.

When executing in native mode, the fetch engine 20 delivers 32 bytes of instruction stream to the execution engine 40. Within each 16 bytes, or "bundle," the RISC ISA defines there to be three 41-bit instructions and five bits of template information. In addition, the fetch engine 20 sends other control information, called pre-decode bits, that it decodes from the 16 bytes of the instruction stream. The predecode bits are used by the execution engine 40 to help it efficiently distribute the six instructions to the proper execution units.

When executing in emulation mode, it is necessary for the execution engine 40 to receive data in exactly the same format as it does in native mode. This allows the vast majority of the execution engine 40 to be designed only for native mode execution, while allowing it also to be used when in emulation mode. Thus, the emulation engine 60 must also deliver 32 bytes of instruction data along with the predecode bits calculated from those 32 bytes.

As stated above, there are six native mode instructions contained in the 32 bytes of instruction stream. However, the performance requirements of this machine are such that in emulation mode, it is sufficient to deliver a maximum of two native mode instructions per cycle to the execution engine 40. This simplifies the design of the emulation hardware because of the template encodings and the dependency requirements between instructions that are imposed by the RISC ISA. By placing only one instruction and two NOPs together per bundle, the emulation hardware has a much easier job of adhering to these architectural requirements.

B. The Bundler

Figure 3:
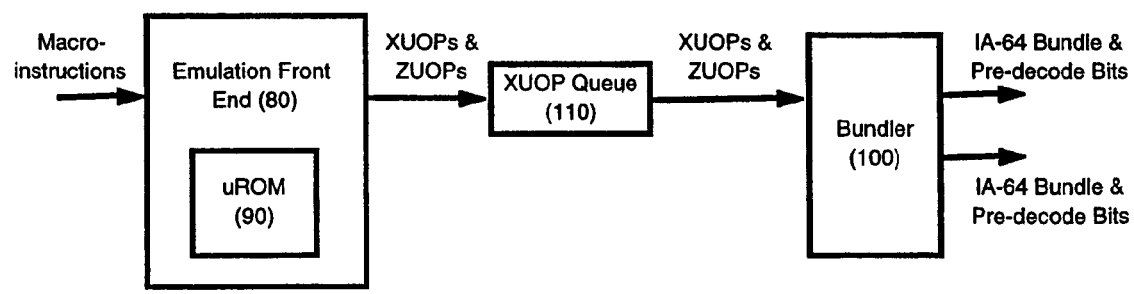
FIG. 3 is a block diagram of an emulation engine.

As noted above, the present invention operates by the use of a bundler 100. The bundler 100 is part of the emulation engine 60. FIG. 3 is a block diagram showing parts of an emulation engine 60, having an emulation front end 80 and a bundler 100. The emulation engine 60 processes a sequence of operations (XUOPs). Between the emulation front end 80 and the bundler 100 is an XUOP queue 110, also referred to as an XUOP buffer. Within the emulation front end 80 is a microcode ROM (uROM) 90. The uROM 90 delivers information to the bundler 100. The function of the bundler 100 is to take XUOPs and other information (including ZUOPs) delivered from the emulation front end 80 within the emulation engine 60, converts this information into a valid 16-byte bundle as defined by the RISC ISA, and deliver to the execution engine 40 two 16-byte bundles and associated pre-decode bits that can be decoded and executed in parallel without violating any architectural dependencies within the pair of bundles. FIG. 4 shows a bundle format, having three 41-bit Syllables and a 5-bit template.

The emulation front end 80 is required to deliver the following bits of information (referred to as "ZUOPs"), in addition to other information not described herein. These ZUOPs are to be used by the bundler 100 as it creates the two 16-byte bundles.

1. Syllable: 41-bit instruction that is understood by the execution engine 40.

2. Immediate: 32-bit immediate field that can be used as an operand.

3. Op-Type: 3-bit field specifying which functional units can execute this type of Syllable.

4. Sub-Type: 3-bit field specifying further information specific to a particular Op-Type.

5. Bnd-Hint: 2-bit field indicating certain dependency restrictions between this Syllable, its predecessor and successor Syllables.

6. Reg-Valid: 4-bit field specifying whether each of four separate fields within in the 41-bit Syllable contain valid register identifiers.

FIG. 5 shows the operation of the bundler 100 in determining how many XUOPs to issue. The bundler 100 issues either 0, 1, or 2 XUOPs per issue-group. The bundler 100 attempts to issue two XUOPs at the same time, if possible. This determination is based on the number of XUOPs in the XUOP queue 110 and on the application of certain rules, described below. The bundler must first determine how many entries are in the XUOP queue 110, in a determination function 200. If the XUOP queue 110 has no entries, then the bundler 100 outputs nothing, as shown by the no XUOP output function 210.

If the XUOP queue 110 has one entry, then a determination function 220 determines whether the Bnd-Hint indicates that two XUOPs must be issued in parallel. If two XUOPs do not need to be issued in parallel, then the one XUOP in the XUOP queue 110 is dispatched into two 16-byte bundles in the one XUOP output function 230. If the determination function 220 determines that two XUOPs must be issued in parallel, then the bundler 100 outputs nothing in the no XUOP output function 210.

If the XUOP queue 110 has two entries, then a determination function 240 determines whether the Bnd-Hint indicates that two XUOPs must be issued in parallel. If the determination function 240 determines that 2 XUOPs must be issued in parallel, then two XUOPs are dispatched into two 16-byte bundles in the two XUOP output function 250. If the determination function 240 determines that two XUOPs are not required to be issued in parallel, then the determination function 260 determines whether any of the following five rules apply:

1. A specific bit in a machine specific register is set to restrict dual issue.

2. Both XUOP's are destined for the same execution unit, unless they are both floating point operations or if they are both "general" ALU operations.

3. Both XUOP's have a Sub-Type that indicates they modify floating point (FP)-stack resources.

4. Both XUOP's have a Sub-Type that indicates they could flush the pipeline based on a comparison result.

5. Comparing register fields that are indicated to be valid by the RegValid bits shows that there is a register dependency hazard between two XUOP's.

If none of the five rules apply, then two XUOPs are dispatched into two 16-byte bundles in the two XUOP output function 250. If any of these five rules do apply, then one XUOP is dispatched into two 16-byte bundles, in the one XUOP output function 230.

C. Transferring Extra Information

In a preferred embodiment, the present invention also transfers extra information between the emulation engine 60 and the execution engine 40. In one embodiment, the 32-bit Immediate is transferred from the emulation front end 80 to the execution engine 40. The RISC ISA has a memory, long-immediate, integer template (MLI). In native mode this template specifies that the third Syllable within the 128-bit bundle is an integer instruction that operates on a 64-bit Immediate, 23 of which bits are contained in the third Syllable (I) and 41 of which bits are contained in the second Syllable (L). The execution engine 40 is designed to interpret the MLI template differently when in emulation mode. In emulation mode the third Syllable contains an integer instruction that operates on a 32-bit immediate, all of which is contained in the second Syllable. In one embodiment, the present invention uses the MLI template to send extra information between the emulation engine 60 and the execution engine 40.

In another embodiment of the present invention, extra information may be sent between the emulation engine 60 and the execution engine 40 for floating-point operations. For those operations, the bundler 100 generates an MFI template. The MFI template specifies that the first syllable within the 128-bit bundle is a memory instruction, the second syllable is a floating point instruction, and the third syllable is an integer instruction. When executing an FP instruction the second syllable contains an FP instruction, while the first and third syllables contain NOPs. In this case, extra bits of control information are sent to the execution engine as part of the NOP in the first Syllable. These bits of NOP Syllable are normally ignored in native mode, but they are treated specially by the execution engine 40 when in emulation mode.

Although the present invention has been described in detail with reference to certain embodiments thereof, variations are possible. For example, although the sizes of certain data, bundles, templates, and other specific information were given by way of example, these specifics are only by way of illustration. Therefore, the present invention may be embodied in other specific forms without departing from the essential spirit or attributes thereof. It is desired that the embodiments described herein be considered in all respects as illustrative, not restrictive, and that reference be made to the appended claims for determining the scope of the invention.

We claim:

1. A method for implementing two types of architectures on a chip, comprising:
   receiving instructions from a fetch engine,
   determining whether each instruction is a macroinstruction or a microinstruction,
   if the instruction is a macroinstruction,
     sending the macroinstruction to an emulation engine,
     decomposing the macroinstruction into one or more microinstructions,
     formatting, by a bundler, the microinstructions into bundles as preferred by the native microarchitecture,
     dispatching a bundle in parallel to an execution engine via a multiplexer, and
     dispatching additional information to the execution engine, wherein the additional information is contained in bits of the bundle otherwise not required for emulation of the macroinstruction, and
   if the instruction is microinstruction, dispatching the microinstruction to the execution engine via the multiplexer;
   selecting either the microinstruction from the fetch engine or the bundle from the emulation engine, by using the multiplexer;
   dispatching the selected microinstruction/bundle to the execution engine; and
   wherein the bundler receives at least one sequence of instructions ("XUOPs"), determines how many XUOPs are received, and when more than one XUOP is received, determines whether the XUOPs must be issued in parallel.

2. A method for implementing two types of architectures on a chip, comprising:
   receiving an instruction from a fetch engine,
   determining whether the instruction is a macroinstruction or a microinstruction,
   if the instruction is a macroinstruction,
     sending the macroinstruction to an emulation engine,
     decomposing the macroinstruction into one or more microinstructions,
     formatting, by a bundler, the microinstructions into bundles as preferred by the native microarchitecture, wherein the bundler receives at least one sequence of instructions ("XUOPs"), determines how many XUOPs are received, and when more than one XUOP is received, determines whether the XUOPs must be issued in parallel,
     dispatching one or more bundles, wherein the dispatching one or more bundles dispatches a plurality of the bundles containing XUOPs when a plurality of XUOPs must be issued in parallel, and the dispatching one or more bundles dispatches one or more bundles per the following rules:
       when the XUOPs must be issued in parallel, dispatches plurality of the bundles containing the XUOPs to the execution engine in parallel,
       when the XUOPs need not be issued in parallel, determines whether a particular problem exists, and
         when the problem does not exist, dispatches a plurality of the bundles containing the XUOPs to the execution engine in parallel,
         when the problem does exist, dispatches a plurality of the bundles containing one of the XUOPs to the execution engine,
       when only one XUOP is received, determines whether the one XUOP must be issued in parallel with another XUOP, and
         when the one XUOP must be issued in parallel, dispatches nothing to the execution engine,
         when the one XUOP need not be issued in parallel, dispatches the bundle containing the one XUOP to the execution engine,
   if the instruction is microinstruction, dispatching the microinstruction to the execution engine, and
   dispatching additional information to the execution engine, wherein the additional information is contained in bits of the bundle otherwise not required for emulation of the macroinstruction.

3. A method for implementing two architectures on a chip, comprising,
   decoding a macroinstruction into one or more microinstructions, through the use of an emulation engine,
   formatting the microinstructions into bundles, by use of a bundler, as preferred by the native microarchitecture, wherein the bundler
     receives at least one sequence of instructions (an "XUOP"),
     determines how many of the at least one XUOP are received, and
       when more than one XUOP is received, determines whether the XUOPs must be issued in parallel,
   dispatching the bundle to an execution engine, and
   dispatching additional information to the execution engine, wherein the additional information is contained in bits of the bundle otherwise not required for emulation of the macroinstruction.

4. The method according to claim 3 wherein the additional information includes an immediate from an emulation front end that is sent by using a memory, long-immediate, integer ("MLI") template that is interpreted by the execution engine differently, depending upon whether the execution engine is operating in native mode or emulation mode.

5. The method of claim 4, wherein, when the execution engine is operating in native mode, the MLI template specifies that a third syllable of the bundle contains an integer instruction that operates on an immediate located in second and third syllables of the bundle, and, when the execution engine is operating in emulation mode, the MLI template specifies that the third syllable of the bundle contains an integer instruction that operates on an immediate located entirely within the second syllable.

6. The method according to claim 3 wherein the additional information includes control information from the emulation front end that is sent using a memory, floating point, integer ("MFI") template, wherein the MFI template specifies that the bundle includes a memory instruction in a first syllable, a floating point instruction in a second syllable, and an integer instruction in a third syllable.

7. The method of claim 3, wherein the emulation engine delivers a pre-decode bit to the execution engine along with the bundle.

8. The method of claim 3, wherein the step of determining whether the XUOPs must be issued in parallel uses the following rules:
   when the XUOPs must be issued in parallel, issues a plurality of the bundles containing the XUOPs to the execution engine in parallel,
   when the XUOPs need not be issued in parallel, determines whether a particular problem exists, and
      when the problem does not exist, dispatches a plurality of the bundles containing the XUOPs to the execution engine in parallel,
      when the problem does exist, dispatches a plurality of the bundles containing one of the XUOPs to the execution engine,
   when only one XUOP is received, determines whether the one XUOP must be issued in parallel with another XUOP, and
      when the one XUOP must be issued in parallel, dispatches nothing to the execution engine,
      when the one XUOP need not be issued in parallel, dispatches the bundle containing the one XUOP to the execution engine.

9. A method for implementing two architectures on a chip, comprising:
   decoding a macroinstruction into one or more microinstructions, through the use of an emulation engine,
   converting the one or more microinstructions into a bundle, using a bundler, the bundle having at least one syllable and having a template that specifies a type of data included in the bundle, wherein the emulation engine delivers a pre-decode bit to the execution engine along with the bundle, and wherein the bundler
   receives at least one sequence of instructions (an "XUOP"),
   determines how many of the at least one XUOP are received, and
   when more than one XUOP is received,
      determines whether the XUOPs must be issued in parallel, and
      when the XUOPs must be issued in parallel, issues a plurality of the bundles containing the XUOPs to the execution engine in parallel,
      when the XUOPs need not be issued in parallel, determines whether a particular problem exists, and
         when the problem does not exist, dispatches a plurality of the bundles containing the XUOPs to the execution engine in parallel,
         when the problem does exist, dispatches a plurality of the bundles containing one of the XUOPs to the execution engine,
   when only one XUOP is received, determines whether the one XUOP must be issued in parallel with another XUOP, and
      when the one XUOP must be issued in parallel, dispatches nothing to the execution engine,
      when the one XUOP need not be issued in parallel, dispatches the bundle containing the one XUOP to the execution engine,
   dispatching the bundle to an execution engine together with a pre-decode bit, and
   transferring, by the emulation engine, additional information to the execution engine, wherein the additional information includes an immediate from an emulation front end that is sent by using an memory, long-immediate, integer ("MLI") template that is interpreted by the execution engine differently, depending upon whether the execution engine is operating in native mode or emulation mode.

10. The method of claim 9, wherein the additional information is contained in bits of the bundle otherwise not required for emulation of the macroinstruction.

11. The method of claim 9, wherein, when the execution engine is operating in native mode, the MLI template specifies that a third syllable of the bundle contains an integer instruction that operates on an immediate located in second and third syllables of the bundle, and, when the execution engine is operating in emulation mode, the MLI template specifies that the third syllable of the bundle contains an integer instruction that operates on an immediate located entirely within the second syllable.

12. A method for implementing two architectures on a chip, comprising:
   decoding a macroinstruction into one or more microinstructions, through the use of an emulation engine,
   converting the one or more microinstructions into a bundle, using a bundler, the bundle having at least one syllable and having a template that specifies a type of data included in the bundle, wherein the emulation engine delivers a pre-decode bit to the execution engine along with the bundle, and wherein the bundler
   receives at least one sequence of instructions (an "XUOP"),
   determines how many of the at least one XUOP are received, and
   when more than one XUOP is received,
      determines whether the XUOPs must be issued in parallel, and
      when the XUOPs must be issued in parallel, issues a plurality of the bundles containing the XUOPs to the execution engine in parallel,
      when the XUOPs need not be issued in parallel, determines whether a particular problem exists, and
         when the problem does not exist, dispatches a plurality of the bundles containing the XUOPs to the execution engine in parallel,
         when the problem does exist, dispatches a plurality of the bundles containing one of the XUOPs to the execution engine,
   when only one XUOP is received, determines whether the one XUOP must be issued in parallel with another XUOP, and
      when the one XUOP must be issued in parallel, dispatches nothing to the execution engine,
      when the one XUOP need not be issued in parallel, dispatches the bundle containing the one XUOP to the execution engine,
   dispatching the bundle to an execution engine together with a pre-decode bit, and
   transferring, by the emulation engine, additional information to the execution engine, wherein the additional information including control information from the emulation front end that is sent using a memory, floating-point, integer ("MFI") template, wherein the MFI template specifies that the bundle includes a memory instruction in a first syllable, a floating point instruction in a second syllable, and an integer instruction in a third syllable.

13. The method of claim 12, wherein the additional information is contained in bits of the bundle otherwise not required for emulation of the macroinstruction.

* * * * *